United States Patent

[11] 3,582,739

| [72] | Inventors | Heinz Daab<br>Darmstadt;<br>Karl-Heinz Meier, Darmstadt, Im Fluerchen, both of, Germany |
|---|---|---|
| [21] | Appl. No. | 838,930 |
| [22] | Filed | July 3, 1969 |
| [45] | Patented | June 1, 1971 |
| [73] | Assignee | Quick-Rotan Becker & Notz KG.<br>Darmstadt, Germany |
| [32] | Priority | July 9, 1968 |
| [33] | | Germany |
| [31] | | P 17 63 657.6 |

[54] SYNCHRONIZER FOR PRESETTING THE STOP POSITION OF A ROTARY SHAFT
8 Claims, 5 Drawing Figs.

[52] U.S. Cl. ............................................. 318/275,
112/219, 318/369, 318/467
[51] Int. Cl. ............................................. H02p 3/04
[50] Field of Search ............................................. 318/275,
367, 372, 466; 112/219 A; 324/173, 70 C—G, 161

[56] References Cited
UNITED STATES PATENTS

| 3,163,811 | 12/1964 | Vaucher | 318/275 |
|---|---|---|---|
| 3,317,829 | 5/1967 | Kuhrt et al. | 324/70 |
| 3,367,296 | 2/1968 | Harruff | 112/219 |
| 3,477,022 | 11/1969 | Le Masters | 324/70 |
| 3,482,538 | 12/1969 | Hayashi | 112/219 |

FOREIGN PATENTS

| 1,296,432 | 5/1969 | Germany | 324/174 |
|---|---|---|---|

*Primary Examiner*—Oris L. Rader
*Assistant Examiner*—K. L. Crosson
*Attorney*—Otto John Munz

ABSTRACT: A contact-free synchronizer for presetting two distinct, independently adjustable stopping positions of the work shaft of an electric drive with electromagnetic brake. The stop pulses are obtained by two oppositely magnetized permanent magnets rotating at a common radius but at different angular positions past a stationary Hall generator whose output is fed, via a differential amplifier and flip-flop, to the brake, so that only the signal of one magnet is utilized. To switch the brake to the signal of the other magnet, it is only necessary to reverse the potential of the Hall generator.

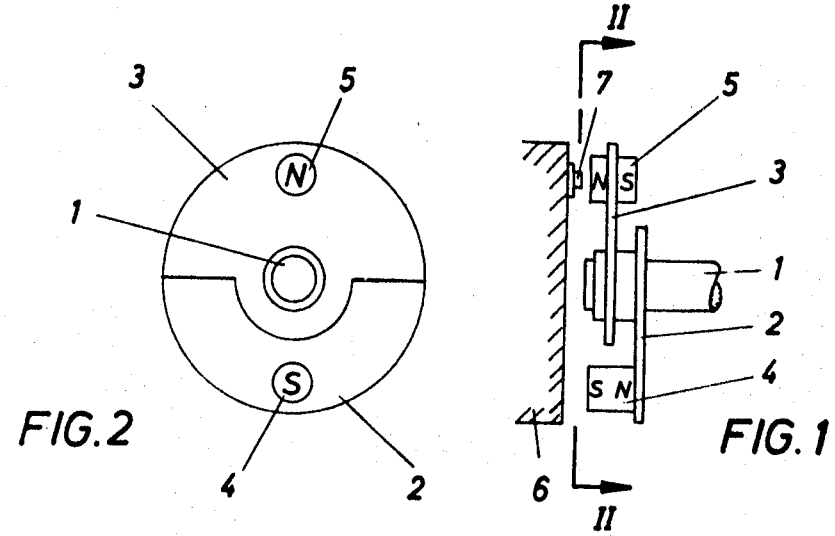
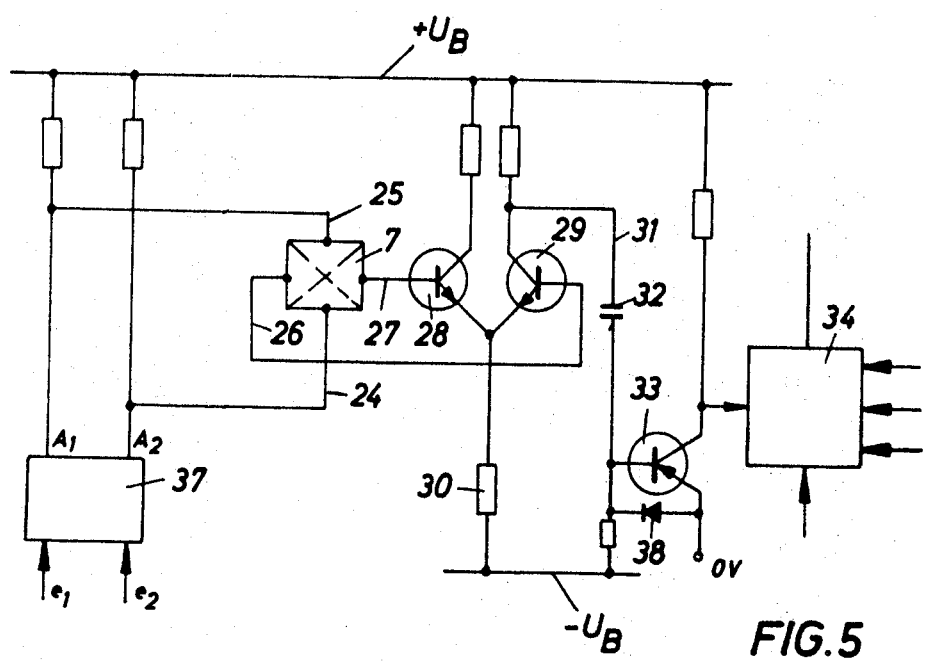

SYNCHRONIZER FOR PRESETTING THE STOP POSITION OF A ROTARY SHAFT

FIELD OF THE INVENTION

The present invention relates to a synchronizer for presetting the stopping position of a working machine shaft in electric drives with electromagnetically actuated brake, with one structural part being in operative engagement with the working machine shaft, and one stationary structural part.

DESCRIPTION OF THE PRIOR ART

Synchronizers of the type referred to hereinabove are frequently employed in connection with clutch motors with electromagnetically actuated friction clutch and friction brake when it is intended to stop a working machine shaft, for example the winding shaft of a spring winding machine or the arm shaft of a sewing machine, in a predetermined angular position or in one of several selectively predeterminable angular positions. The known synchronizers generally consist of either one or several slip ring contacts which are disposed either on the shaft of the drive motor or, more expediently, on the working machine shaft itself, and which cooperate with stationary brush contacts (see, for example U.S. Pat. No. 3,174,450). Slip ring contacts are, however, necessarily subjected to wear and tear. Due to the carbon layer or deposit formed on the insulating rings, the insulating resistance is steadily reduced in the course of time. Disturbances may be produced also by impurities, cracking or bursting of the contacts at the contact edges, and spark formation.

SUMMARY OF THE INVENTION

The drawbacks outlined hereinabove are effectively eliminated with the aid of the present invention by virtue of the fact that the structural element which is in operative engagement with the working machine shaft is provided with a permanent magnet and that the stationary structural element is provided with a Hall generator which gives off a voltage pulse during the passage of the permanent magnet. The synchronizer proposed by the present invention is contact-free so that any problems pertaining to moving contacts are obviated. The synchronizer according to the invention is characterized by a high degree of reliability of operation and freedom from maintenance; its service life is long. The manufacturing costs thereof are nevertheless comparatively small.

Preferably present are two permanent magnets which are arranged at a different angular position with respect to the working machine shaft and have opposite direction of magnetization. Since the polarity of the signal produced by the Hall generator depends upon the direction of magnetization of the permanent magnet, voltage pulses of variable polarity are obtained in this manner which are separated by means of an amplification circuit and may be utilized selectively to stop the working machine shaft in one of two angular positions.

The angular positions of the permanent magnets with respect to the working machine shaft are suitably adjustable independently of each other. According to a further feature of the present invention, the amplifying circuit connected to the output of the Hall generator allows the signals of one polarity to pass while suppressing signals of the other polarity, whereby the polarity of the supply voltage of the Hall generator is reversible. This synchronizer circuit arrangement limits the circuitry needs to the processing of pulses of only one polarity, and the selection between one of two predetermined stopping positions may be effected simply by reversing the polarity of the supply voltage of the Hall generator. The circuit employed preferably includes a differential amplifier consisting of two transistors having a common emitter resistance.

BRIEF DESCRIPTION OF THE DRAWINGS

Further features, advantages and possibilities of application of the present invention will become apparent from the following description of one embodiment thereof, when taken in connection with the accompanying drawings, wherein FIG. 1 is a schematic representation of the pulse giver of the synchronizer according to the present invention in a lateral view thereof;

FIG. 2 is a view of the rotating pulse giver part taken along line II–II of FIG. 1;

FIG. 5 shows the selection and amplification circuit of the synchronizer.

DESCRIPTION OF THE PREFERRED EMBODIMENTS

Figure 3:
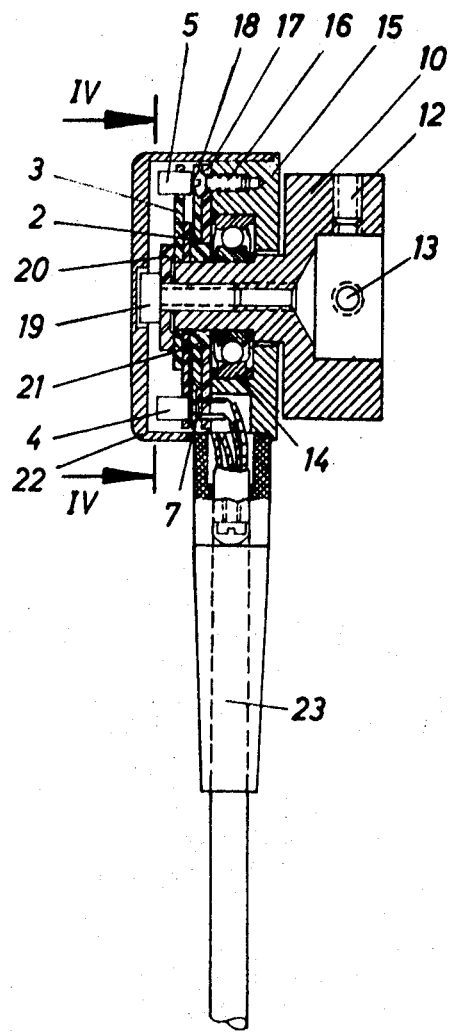
FIG. 3 is a detailed cross-sectional view through a pulse giver for a synchronizer taken along line III–III of FIG. 4.

According to FIGS. 1 and 2, two essentially semicircular discs 2, 3 are mounted on the shaft 1 of the working machine. The disc 2 is provided with a permanent magnet 4 having the NS axis parallel to the axis of the shaft 1 while a permanent magnet 5 is secured to the disc 3 at the same radial distance from the axis of the shaft 1. The NS magnetic axis of the permanent magnet 5 is likewise parallel to the axis of the shaft 1, but has an opposite direction with respect to NS axis of the magnet 4. The discs 2, 3 may be arranged rotatably with respect to each other in order to permit adjustment of the angular positions of the magnets 4, 5.

Positioned opposite the discs 2, 3 is a stationary carrier 6 and mounted thereon is a Hall generator 7 whose radial distance from the shaft 1 corresponds to the radial distance of the magnets 4, 5 from this shaft. When the shaft 1 turns and when, as a result, the magnets 4, 5 rotate, the Hall generator 7 supplies a voltage pulse each time one of the magnets 4, 5 passes in front of the generator 7. The polarity of the output pulse of the Hall generator 7 depends upon the direction of magnetization of the permanent magnets 4, 5. Since the magnets are oppositely magnetized, the Hall generator 7 furnishes two pulses of opposite polarity for each complete revolution of the working machine shaft 1. These pulses are used to stop the working machine shaft 1 in one of the two angular positions determined by the position of the permanent magnets 4, 5.

Figure 4:
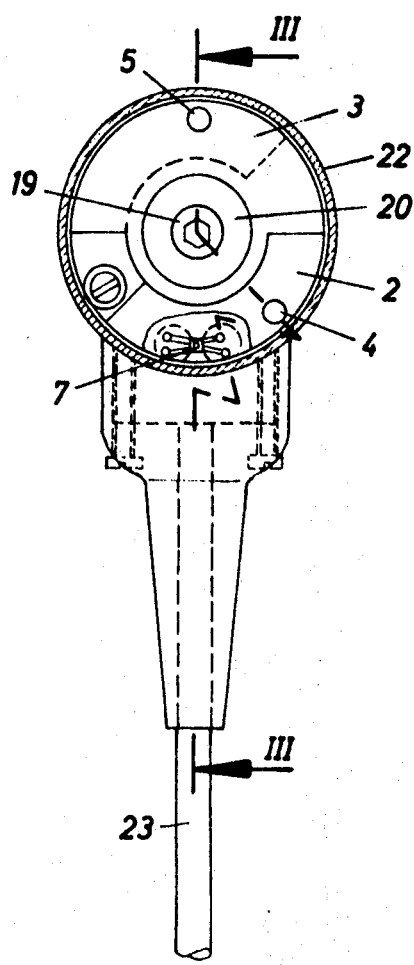
FIG. 4 is a cross-sectional view taken along line IV–IV of FIG. 3.

The synchronizer illustrated in detail in FIGS. 3 and 4 comprises a rotary body 10 which is mounted on one end of the working machine shaft 1, (not shown) and held in place by means of setscrews which are threaded into tapholes 12, 13 of the rotary body 10. Mounted upon the trunnion part of the rotary body 10 is a ball bearing 14 the outer ring of which is positioned within a stationary housing part 15. Secured to the housing part 15 by means of a screw 16 are two discs 17, 18. The disc 17 which corresponds to the carrier 6 of FIG. 2 carries the Hall generator 7. The disc 18 covers the Hall generator and protects it in this manner from damages during the assembly and adjustment of the synchronizer. Mounted on the outer end of the rotary body 10 are the discs 2, 3 and attached to the latter are the permanent magnets 4 and 5, respectively. The discs are clamped, by means of a clamping bolt 19 threaded into the rotary body 10 and a clamping disc 20, against an intermediate ring 21 which, in turn, abuts against the inner ring of the ball bearing 14. As long as the clamping bolt 19 is still loosened, the discs 2, 3 may be turned with respect to the rotary body 10 and hence the working machine shaft 1, so as to adjust the angular position of the permanent magnets 4, 5. After the clamping bolt 19 has been tightened, the discs 2, 3 are positively connected via the rotary body 10 with the working machine shaft 1 in a manner.

A cap 22 is detachably placed upon the housing part 15. A cable 23 carries the supply leads 24, 25 and the output leads 26, 27 of the Hall generator 7.

As is apparent from FIG. 5, the output leads 26, 27 of the Hall generator 7 are connected to the input of a differential amplifier which comprises two transistors 28, 29 having a common emitter resistance 30. The output 31 of the differential amplifier is connected via a capacitor 32 with the base of a transistor 33 to whose collector terminal is connected the control input of a flip-flop 34. The flip-flop 34 controls the actuation of the brake of the drive motor in a manner which has not been further described herein. The transistor 29 of the differential amplifier is normally biased almost up to saturation. The voltage at the output 31 changes substantially only when the Hall voltage produced by the generator 7 is of such polarity that it will bias the transistor 29 out of saturation. This is the case when the potential of the output lead 26 becomes negative with respect to the potential of the output lead 27 caused by the passage of the correspondingly magnetized permanent magnet 4 or 5 in front of the Hall generator 7. The impulse produced by the Hall generator 7 during the passage of the other permanent magnet is suppressed by the differential amplifier. A diode 38 between the base and the emitter of the transistor 33 suppresses any negative residual signals at the input of the transistor 33.

The supply lines 24, 25 of the Hall generator 7 are connected to the outputs $A_1$, $A_2$ of a flip-flop 37 which permits reversing of the polarity of the supply voltage applied to the Hall generator 7. This has the result that in one position of the flip-flop 37 one of the permanent magnets, for example the permanent magnet 4, effects a response of the flip-flop 34 whereas in the other position of the flip-flop 37, the flip-flop 34 is energized in response to the angular position of the other permanent magnet, for example the magnet 5.

If additional stopping positions are desired a second Hall generator may be mounted on the disc 17 which cooperates with a second pair of permanent magnets.

Various modifications are contemplated and may be obviously resorted to by those skilled in the art without departing from the spirit and scope of the invention as hereinafter defined by the appended claims.

We claim:

1. A contact-free synchronizing device for selectively stopping an electromagnetically stoppable drive mechanism at one of two preset angular positions of a drive shaft, comprising in combination:
   a rotary body operatively connected to the drive mechanism for rotation thereby;
   a housing part mounted in a fixed axial position relative to the rotary body;
   a first and second permanent magnet attached to the rotary body at different angular positions relative to its rotational axis and so as to move through a common rotational path,
   the magnetic axes of the magnets being substantially parallel to the rotational axis, their magnetic polarities, however, facing in opposite directions;
   on the housing part, mounted in the vicinity of the path of the two magnets, means electrically responsive to the moving force fields of the magnets so as to produce a distinct first type of signal during the passage of the first magnet and a distinct second type of signal during the passage of the second magnet;
   circuitry means distinguishing between the two types of response signals, selecting only the first type of signal, while suppressing the second one, the selected first type of signal being usable to electromagnetically stop the drive mechanism at an angular position determined by the angular position of the first rotating magnet.

2. The device as defined in claim 1, further comprising:
   signal-reversing means cooperating with the field-responsive means to cause the first magnet to produce the second type of signal and the second magnet to produce the first type of signal, so that the first type of signal, when used to electromagnetically stop the drive mechanism, stops the latter at an angular position determined by the angular position of the second rotating magnet.

3. The device as defined in claim 2, wherein the field-responsive means include a so-called Hall generator and a DC voltage supply, and wherein the signal-reversing means include voltage-reversing means for the Hall generator.

4. The device as defined in claim 3, wherein the voltage-reversing means is a bipolar reversing switch.

5. The device as defined in claim 1, wherein the selecting circuitry means include a differential amplifier to select and amplify the first type of signal.

6. The device as defined in claim 5, wherein the differential amplifier includes two transistors having a common emitter resistance, one of the transistors being biased to near saturation, so that only the first type of signal, by reducing its bias, markedly changes its output.

7. The device as defined in claim 1, wherein the first and second magnets include separate attachment means for each of them, permitting independent angular adjustment of the position of each magnet relative to the rotary body.

8. The device as defined in claim 7, wherein the rotary body includes a trunnion on one extremity and a ball bearing on the trunnion positioning the rotary body relative to the housing part;
   and the housing part includes a disc surrounding the trunnion axially outside the ball bearing, the disc carrying the field-responsive means;
   and wherein the separate attachment means for the magnets are in the form of two parallel discs, each one carrying a magnet, the discs being centered on, and adjustably clamped to, the extremity of the trunnion.